United States Patent

Honda et al.

[11] Patent Number: 4,657,396
[45] Date of Patent: Apr. 14, 1987

[54] OPTICAL METHOD FOR DETECTING ERRORS IN SHAPE

[75] Inventors: Toshio Honda, Yokohama; Junpei Tsujiuchi, Kawasaki, both of Japan

[73] Assignee: Osaka Seimitsu Kikai Kabushiki Kaisha, Osaka, Japan

[21] Appl. No.: 713,531

[22] Filed: Mar. 19, 1985

[30] Foreign Application Priority Data

Mar. 23, 1984 [JP] Japan .................................. 59-55750

[51] Int. Cl.$^4$ ........................................... G01N 21/88
[52] U.S. Cl. .................................... 356/394; 356/237; 356/445
[58] Field of Search ............... 356/446, 394, 237, 445, 356/426

[56] References Cited

U.S. PATENT DOCUMENTS

| | | | |
|---|---|---|---|
| 3,748,048 | 7/1973 | Upatnieks et al. | 356/394 X |
| 4,053,228 | 10/1977 | Schiller | 356/394 X |
| 4,215,939 | 8/1980 | Miller et al. | 356/445 X |
| 4,412,746 | 11/1983 | Yokouchi | 356/446 |
| 4,563,095 | 1/1986 | Puffer | 356/446 X |

Primary Examiner—Vincent P. McGraw
Attorney, Agent, or Firm—James E. Nilles

[57] ABSTRACT

A method for optically detecting error in shape wherein a laser irradiates with a large angle of incidence the surface of an object to be inspected for its shape and the light wavefront of its positive reflected light from the surface is converted by using a special optical element into a light wavefront that is easily converged, the converted light wavefront is converged and the state of the convergence is detected by a photoelectric detector array, and output signals from the photoelectric detector array are processed to detect and measure the shape error of the surface of the object.

5 Claims, 14 Drawing Figures

FIG. 1
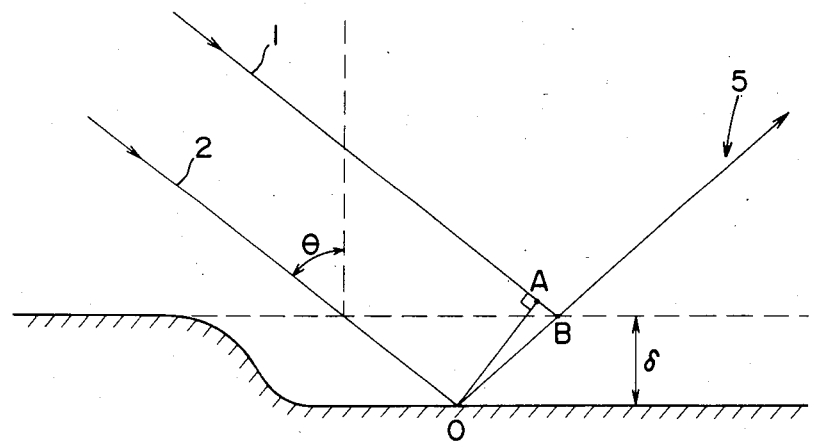
FIG. 2
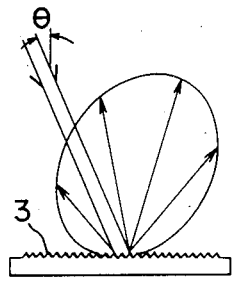
FIG. 3
FIG. 4
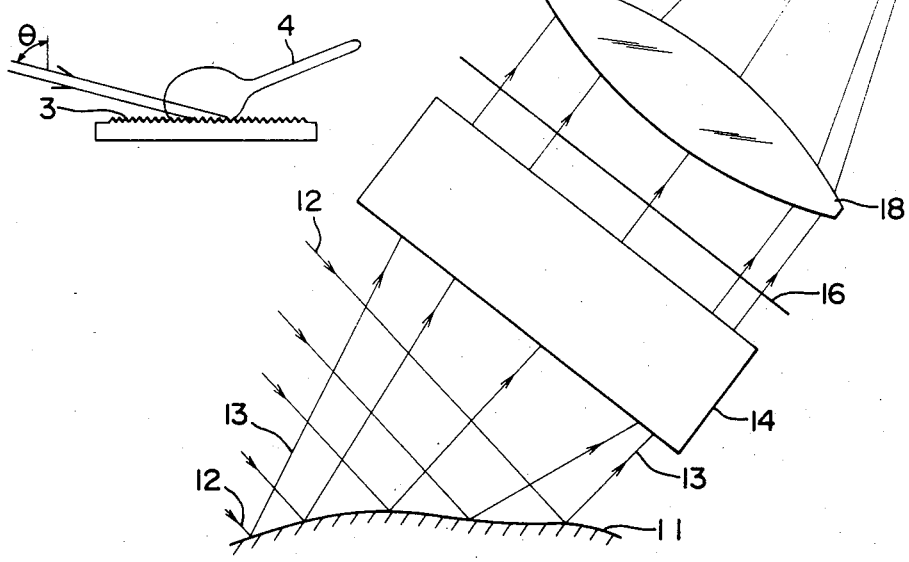

OPTICAL METHOD FOR DETECTING ERRORS IN SHAPE

BACKGROUND OF THE INVENTION

1. Field of the Invention

This invention relates to an optical method for detecting error in shape. By this method, fine error in three-dimensional shape on the surface of an object can be inspected.

2. Description of the Prior Art

Highly accurate machining of parts techniques is frequently required, and the accuracy of machining has been improved. In general, the measurement of the shapes of those parts is performed by using a three dimensional coordinates measurement instrument, but it takes time to take measurement using this instrument, making it unsuitable as an instrument of inspection for the quality control of products in a mass-production.

SUMMARY OF THE INVENTION

A purpose of the invention is to provide a method of optical detection of three-dimensional shape error of surface to be inspected with high-speed and with great sensitivity using a laser light.

The method of the invention is characterized in that it uses a laser which is applied to the surface of an object to be inspected at a large angle of incidence, and the light wavefront specularly reflected by the surface is converted into a plane or spherical wavefront by a special optical element, and the converted wavefront can be concentrated automatically or by a conventional lens to a small point. At the concentrated position of the spherical wavefront, the light intensity distribution is detected photoelectronically on the plane perpendicular to the direction of the light transmission. And the output signals of this photoelectronic device are processed to inspect and measure error in shape on the surface of a body.

Other objects and characteristics of the invention will become apparent by the explanation given below with reference to the attached drawings.

BRIEF DESCRIPTION OF THE DRAWINGS

FIG. 1, FIG. 2 and FIG. 3 are diagrams that explain the sheen phenomenon;

FIG. 4, FIG. 5 and FIG. 6 are diagrams that explain the operation of a special optical element;

DESCRIPTION OF A PREFERRED EMBODIMENT

As shown in FIG. 1, when the surface with some roughness of micro-structure is illuminated by the collimated laser light, the optical path difference Δ between the light 1 and 2 which are reflected specularly to the direction 5 is:

$$\Delta = OB - AB = 2\delta \cos\theta$$

If this optical path difference Δ is short compared with the fractional wave length of the laser light, the portion of the specularly reflected light component increases and the surface can be regarded as a mirror surface. From the above equation, if the surface roughness is comparable as the wavelength, the angle θ of incidence should be large in order to make the optical path difference Δ small.

A machined metal surface 3 is optically a rough one as shown in FIG. 2 unless a special surface finish is applied to it, but as the angle of incidence θ is made larger as shown in FIG. 3, the optical path difference between the light 1 and 2 after the reflection becomes small by the reason as explained above, and as a result, the specularly reflected light component 4 becomes strong and the surface can be regarded as an optical mirror surface. This phenomenon is called "sheen".

Figure 5:
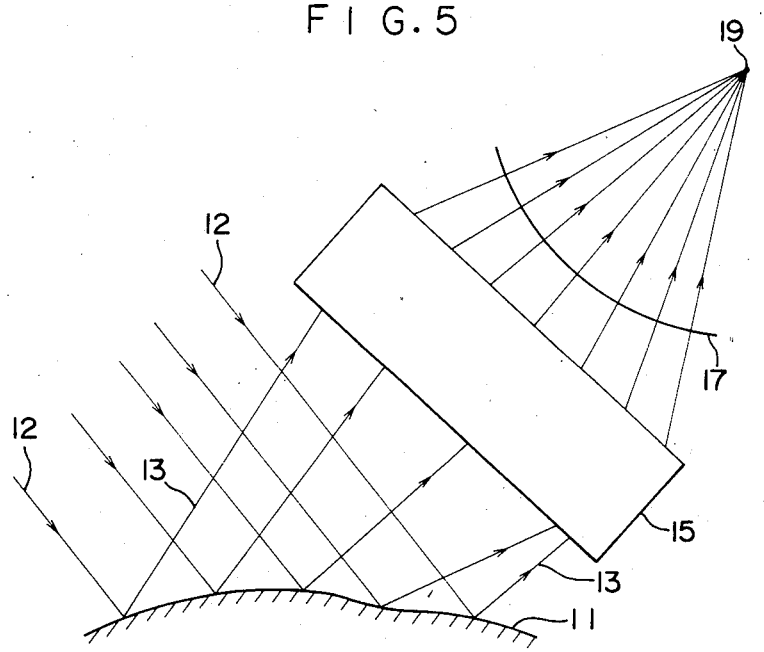

FIGS. 4 and 5 are the cases that the metal surface is a precisely same shape as a designed one. (The surface is called a standard one.) The above mentioned phenomenon is used for the purpose that the machined metal surface 11 operates as a mirror surface when the surface is illuminated by laser light 12. The specularly reflected laser light is led to a special optical element 14 or 15.

The work of this special optical element 14 or 15 is to convert the specularly reflected wavefront 13 which has very large aberration into a plane wavefront 16 in FIG. 4 or a spherical wavefront 17 in FIG. 5. The said plane wavefront 16 can be converged to a very small point by means of a lens 18 or other conventional optical devices. The spherical wave 17 converges to a very small point by itself. The numeral 19 denotes this small convergence point.

Figure 7:
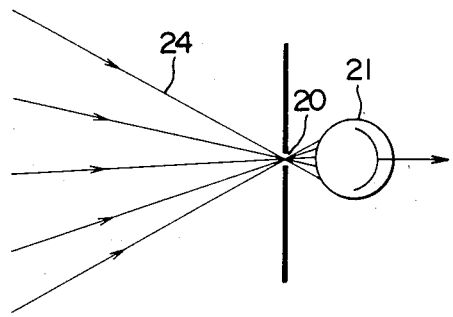
FIG. 7 and FIG. 8 are diagrams that explain the operation of a photoelectric element to detect the output light from the said special optical element through a pinhole.

As shown in FIG. 7, a pinhole 20 with a small opening is placed at the convergence point 19 of the convergent light 24 with the above mentioned plane or spherical wavefront, so almost of the convergent light 24 passes through the pinhole 20. The intensity of the light that passes through the pinhole 20 is measured by a photoelectric detector 21.

When the surface 22 to be inspected, hereinafter called an inspection surface, deviates in its shape from the standard surfac 11 and has an error in shape, the specularly reflected wavefront 23 from the inspection surface 22 differs from the standard wavefront 13 according to the surface shape error, and accordingly the output light 24a from the special optical element 15 becomes different from the spherical convergent light 24. This output wavefront 24a has an abberation. The output light 24a can not be converged to a small point.

Figure 6:
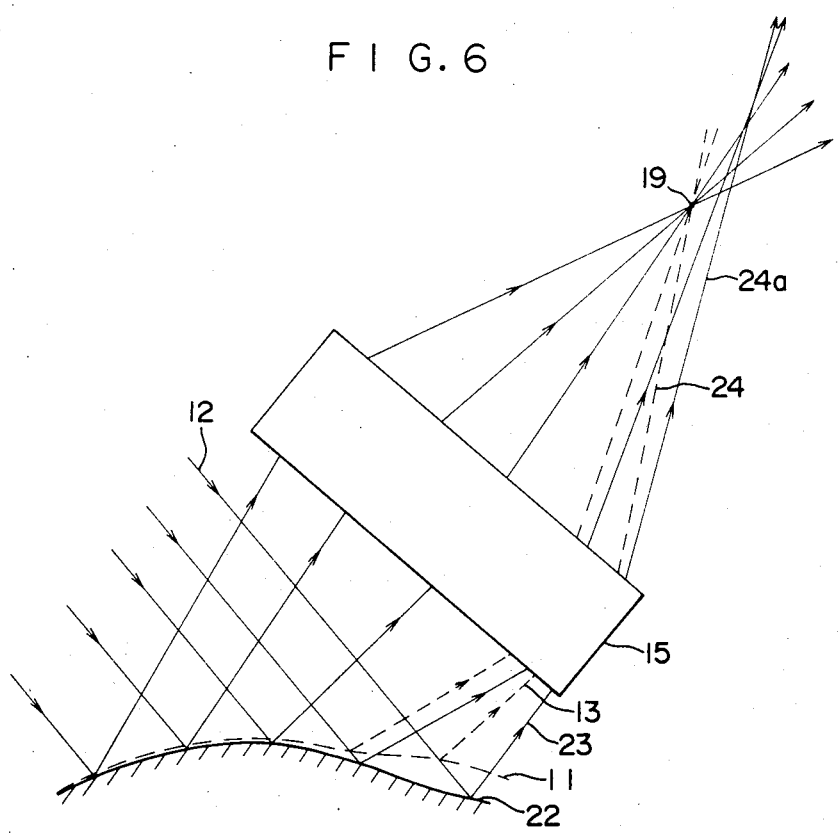
Figure 8:
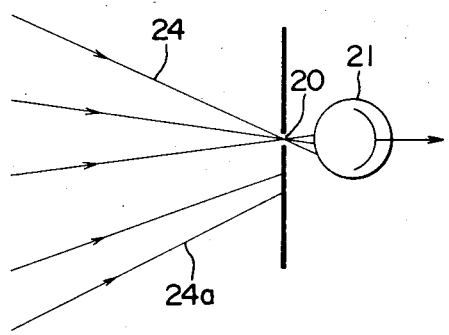

If the shape of the inspection surface 22 is identical with the shape of the standard surface 11, the wavefront output from the special optical element 14 or 15 converges to a point as shown in FIG. 7 and almost the light passes through the pinhole 20, to make the output signal level by the photoelectric detector 21 large. If the shape of an inspection surface 22 deviates from the shape of the standard surface 11 as shown in FIG. 6, in other words if there is error in shape, only a part of the output light from the special optical element 14 or 15 passes through the pinhole 20 as shown in FIG. 8, to make the output signal level by the photoelectric detector small. The extent to which the output signal level is reduced corresponds to the deviation of the inspection surface from the standard surface 11 with very high sensitivity.

Figure 9:
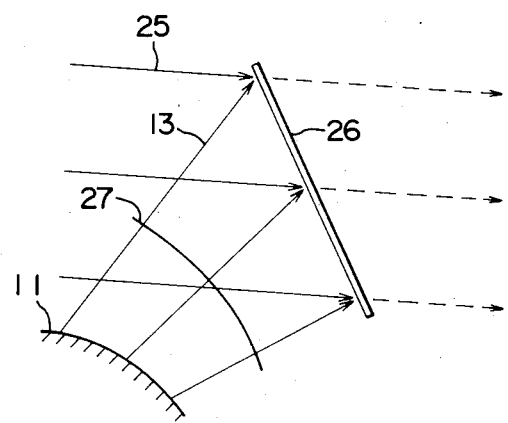
FIG. 9 is a diagram to explain the making of a hologram.
Figure 10:
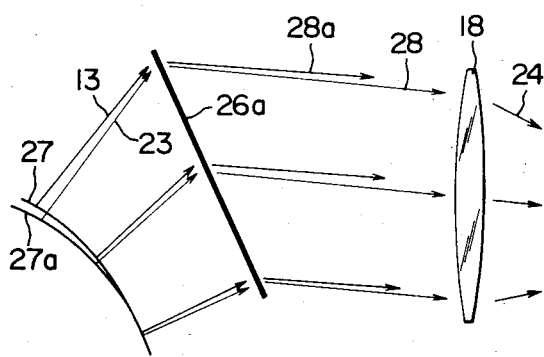
FIG. 10 is a diagram to explain the operation of the holographic optical element.

Next, as one of the special optical element 14 or 15, a hologram can be used to convert the wavefront of large aberration specularly reflected from the inspection surface 11 or 22 into a plane or spherical wavefront. The hologram recording material 26 is recorded with specularly reflected wavefront 13 from the standard surface 11 and a reference light 25 of plane or spherical wavefront, as shown in FIG. 9. After the development, the holographic optical element 26a is set as shown in FIG. 10 exactly at the same position at which it was recorded. The hologram can be made as a computer generated hologram.

Next, this hologram is illuminated only by the wavefront 13 or 23 which is the specularly reflected from the surface 27 or 27a. And the plus first order diffracted wavefront 28 or 28a is regarded as the output wavefront from the hologram 26a.

If the wavefront which illuminates the hologram is quite same as that of the hologram recording, the plane or spherical wavefront 28 which is same as the reference light 25 in the recording step is diffracted, and this wavefront can be converged at a point by a lens. This is the case that the inspection surface has a quite same shape as the standard one.

But, if the inspection surface shape is a little different from the standard, the specularly reflected wavefront 27a becomes a little different from that specularly reflected from the standard surface. As a result, the wavefront 23 which illuminates the hologram varies from the wavefront 13. And, the plus first order diffracted light 28a from the hologram 26a constracts a wavefront that is a little different from the said plane or spherical wavefront. This light wavefront can not be converged to a very small point (convergence point) by a lens.

The above explanation will be summarized as follows:

A laser light 12 illuminates a machined surface (standard surface 11) that has an ideal shape with a large angle of incidence. A hologram 26 is recorded by a specularly reflected light 13 from the surface 11 and a reference light 25 that has a plane wavefront. After the development, it is set exactly at the same place as it was recorded. Then, the standard surface 11 is replaced by an inspection surface 22. The same laser wavefront illuminates the inspection surface 22, and the specularly reflected wavefront illuminates the hologram 26a. A plus first order diffraction wave from the hologram 26a is received by a convex lens 18 and the light intensity distribution on its back focal plane is observed. If the inspection surface 22 is completely the same as the standard surface 11, the above mentioned light intensity distribution is concentrated to a small convergence point 19, but if there is difference in the shapes of the inspection surface and the standard surface, the light intensity distribution at the focal plane spreads or concentrates at a position off the convergence point 19 according to the deformation of the inspection surface. It may be possible, as the most simple detection case therefore, to obtain a correlation between the output of a photo-detector 21 and a quantity of error in shape of an inspection surface 22 with respect to the standard surface 11, if a pinhole 20 is placed at the center of the back focal plane and the intensity of the light passing through the pinhole 20 is measured by the photoelectric detector 21.

Figure 11:
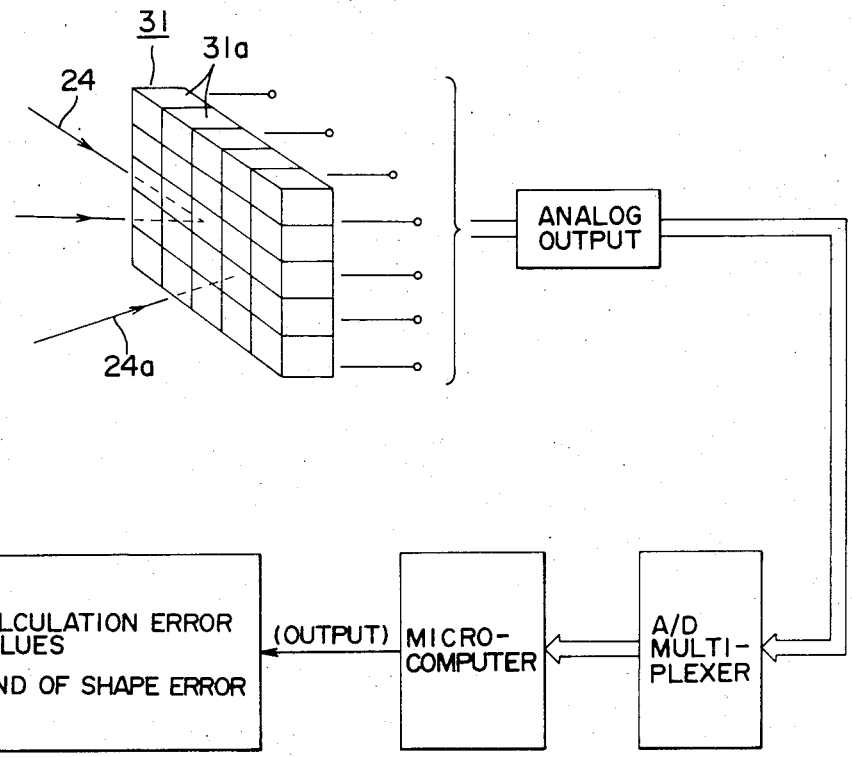
FIG. 11 is a diagram to show an array of photoelectric detection elements that are a substitute for the said pinhole and a processing system for their outputs.

In the above embodiment, the method of placing a pinhole 20 at the convergence plane of the light wave and measuring photoelectrically the light that passes through the pinhole was described as a simplest method to detect signal that corresponds to an error in shape, but it is also possible, besides this method, to arrange a minute photo-detector array 31 at the convergence plane of the above light wave as shown in FIG. 11 and to detect the direction and extent of deviation of an inspection surface 22 from the standard surface 11 by processing output signals from individual photo-detector element 31a with a computer.

Figure 12:
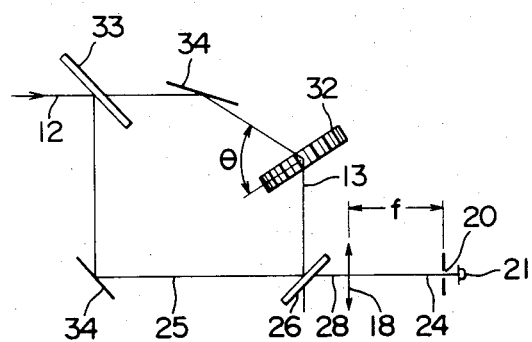
FIG. 12 is an optical setup to make the holographic optical element in the case when the invention is used in detecting error in shape for a tooth shape in a gear.
Figure 13:
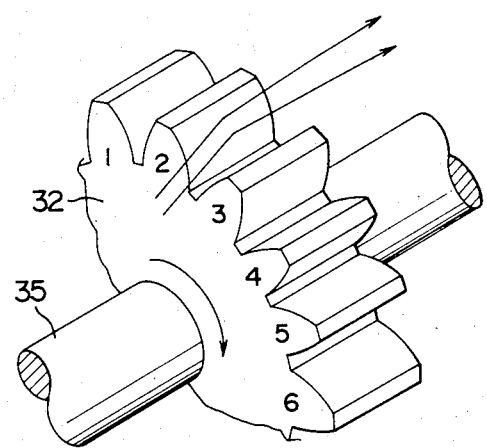
FIG. 13 and FIG. 14 are perspective views of the shape of said gear tooth in FIG. 12.
Figure 14:
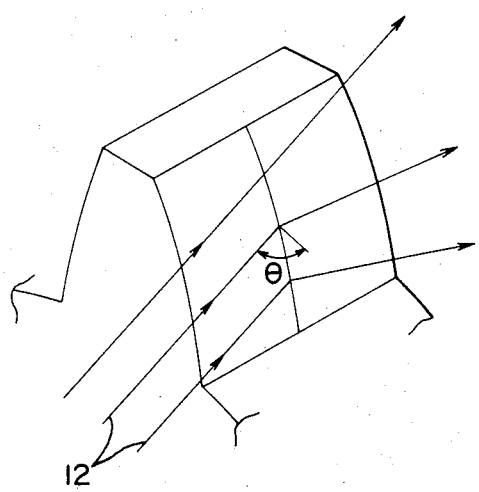

An example of application of the method according to the invention to the tooth flank shapes of a gear for their three-dimensional shape inspection is illustrated in FIG. 12, FIG. 13 and FIG. 14. The tooth flank (of tooth No. 19) that is closest to an ideal involute shape in all the tooth flanks of a gear 32 is regarded as the standard surface. Parallel light 12 of He—Ne laser (wave length=633 $\mu$m) illuminates the tooth flank at an angle of incidence $\theta$ of about 71°, and a hologram 26 is constructed on a glass substrate by the specularly reflected light wavefront 27 and the plane wavefront 25 as the reference light 25 as shown in FIG. 12. In this figure, the numeral 33 denotes a half mirror, and 34 a mirror. First, the hologram 26 is set at the position where it was recorded, and it is illuminated only by the specularly reflected light only from the tooth flank (of tooth No. 19) that is the standard surface. Then the plus 1st order diffraction light 28 from the hologram 26 is collected by a lens 18 with a focal length of f, and the position of the pinhole 20 is adjusted so that the output signal level of the photodetector 21 becomes maximum. At this position the shaft 35 of the gear 32 is rotated to make it advance exactly each one pitch angle in this arrangement, and outputs from the photo-detector 21 for the other tooth flanks are measured rapidly. The ratios of those outputs to that of the standard flank can give information about shape errors of the tooth flanks.

The above mentioned special optical element 14 or 15 is not limited to a hologram; it can be any special optical element made from glass or plastics that is capable of converting a greatly distorted wavefront into a uniform one (plane or spherical wavefront), and a kinoform can be also used.

EFFECTS OF THE INVENTION

The invention consists of four steps as follows: (A) A laser illuminates the surface of an object to be inspected at a large angle of incidence, and the specularly reflected light component with a large reflection angle is used; (B) The wavefront of this specularly reflected light which has a large aberration is converted by a special optical element such as a hologram into a plane or spherical wavefront; (C) The light with its wavefront thus converted is converged, and at its convergence point or near it one or an array of minute photo-detector is placed and those detectors detect the intensity distribution at the converged plane; (D) A small amount of error in shape on the surface of an object to be inspected is obtained through arithmetic processing of the detected light intensity distribution. It is possible, therefore, to realize three-dimensional measurement of error in shape with great sensitivity and with high speed by a combination of those four steps, and the method according to the invention can be used to classify a small amount of shape errors (concavity and convexity, direction of inclination, etc.).

What is claimed is:

1. A method of inspecting a surface of a plurality of gear teeth, which gear teeth are part of a gear affixed to a shaft which is adapted to be rotated, there being a predetermined pitch angle between each of said gear teeth, the purpose of said method being to detect error in the shape of the gear teeth surfaces with respect to a surface of a gear tooth that is chosen because it is closest to an ideal shape, which gear tooth surface is designated the standard surface, said method comprising the steps of:

preparing a special optical element according to said ideal shape;

projecting a collimated light wavefront from a light source onto said standard surface at a sufficiently large angle of incidence so as to result in a specularly reflected light wavefront radiating from said surface;

converting said specularly reflected light wavefront, by means of said special optical element, into a light wavefront that converges to a relatively small point of light;

positioning a convergence measurement means at a location where the convergence of the light wavefront reflected from said standard surface is maximized;

stepwise rotating said shaft rapidly so that said gear advances exactly one pitch angle at a time until all of the gear teeth have had said collimated light wavefront projected thereon;

measuring the convergence of light distribution at said location for each tooth to obtain information about any shape errors of said gear teeth.

2. A method as recited in claim 1 wherein said converting step results in a spherical wavefront which converges to a relatively small point of light by itself.

3. A method as recited in claim 1 wherein said converting step results in a planar wavefront and wherein said method further comprises the step of converging said planar wavefront into a relatively small point of light by means of a lens.

4. A method as recited in claim 1 wherein said step of positioning said convergence measuring means includes locating a plurality of small photoelectric detector array elements at said location.

5. A method as recited in claim 1 wherein said step of positioning said convergence measuring means comprises the steps of:

directing said converted light wavefront through a pinhole located at a distance from said special optical element as to maximize the light passing through said pinhole; and detecting the intensity of the light passing through said pinhole by means of a photoelectric detector which provides an electrical signal proportional to the intensity of said converted light wavefront passing through said pinhole.

* * * * *